(12) United States Patent
Fitch et al.

(10) Patent No.: US 8,656,130 B2
(45) Date of Patent: Feb. 18, 2014

(54) LOW LATENCY AND PERSISTENT DATA STORAGE

(75) Inventors: Blake G. Fitch, Croton-on-Hudson, NY (US); Michele M. Franceschini, White Plains, NY (US); Ashish Jagmohan, Irvington, NY (US); Todd E. Takken, Brewster, NY (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/336,287

(22) Filed: Dec. 23, 2011

(65) Prior Publication Data

US 2013/0166821 A1    Jun. 27, 2013

(51) Int. Cl.
*G06F 12/00* (2006.01)

(52) U.S. Cl.
USPC ........... 711/167; 711/103; 711/104; 711/117; 711/118

(58) Field of Classification Search
None
See application file for complete search history.

(56) References Cited

U.S. PATENT DOCUMENTS

| | | |
|---|---|---|
| 2010/0332730 A1 | 12/2010 | Royer, Jr. et al. |
| 2011/0041005 A1 | 2/2011 | Selinger |
| 2011/0041039 A1 | 2/2011 | Harari et al. |
| 2011/0060864 A1 | 3/2011 | Yoshii et al. |
| 2012/0042200 A1* | 2/2012 | Takeuchi et al. ............... 714/6.2 |

* cited by examiner

*Primary Examiner* — Shawn X Gu
(74) *Attorney, Agent, or Firm* — Cantor Colburn LLP (57) ABSTRACT

Persistent data storage is provided by a method that includes receiving a low latency store command that includes write data. The write data is written to a first memory device that is implemented by a nonvolatile solid-state memory technology characterized by a first access speed. It is acknowledged that the write data has been successfully written to the first memory device. The write data is written to a second memory device that is implemented by a volatile memory technology. At least a portion of the data in the first memory device is written to a third memory device when a predetermined amount of data has been accumulated in the first memory device. The third memory device is implemented by a nonvolatile solid-state memory technology characterized by a second access speed that is slower than the first access speed.

20 Claims, 4 Drawing Sheets

LOW LATENCY AND PERSISTENT DATA STORAGE

This invention was made with Government support under Contract Number B554331 awarded by the Department of Energy. The U.S. Government has certain rights to this invention.

BACKGROUND

The present invention relates to data storage, and more specifically, to providing persistent data storage with low latency.

Contemporary computer systems often utilize data processing and storage devices that have a redundant energy supply to provide the persistence desired for storage of important data. Redundant energy supplies include the use of a battery backup or a super capacitor in order to provide a failsafe power supply mechanism to enable writing of "in flight" data in case of power failure in the computer system. In some cases, data reliability and consistency are provided through suitable techniques such as journaling (or logging). The time it takes to write log entries to a persistent memory device, including the time it takes to receive an acknowledgment that a log entry has been written to persistent storage is often in the critical path for memory device accesses. These long latency writes that include both writing and receiving acknowledgement have an impact on high performance storage operations.

Attempts have been made to decrease their impact, for example, by committing a write operation (i.e., sending an acknowledgement that the data has been written) whenever the associated data is buffered in a memory that is protected by battery, super capacitor or other redundant energy supply. Drawbacks to this approach include poor reliability, high maintenance, increased complexity of design (multiple power domains for persistent boundaries, etc.), and form-factor disadvantages. In general, capacitors suffer from low reliability, the batteries will require maintenance, and if the data is not moved quickly enough (i.e., before power is lost) data may be lost. In a "not-and" (NAND) non-volatile flash based storage device one possibility for ensuring persistence of critical data (e.g., file system metadata) is to return from a data write only when the corresponding metadata write has been written to the NAND flash device. A shortcoming to this approach is the high latency for every page write, which will significantly reduce the write bandwidth.

SUMMARY

Embodiments include a method and computer program product for storing data that includes receiving a low latency store command that includes write data. The write data is written to a first memory device in response to receiving the low latency store command. The first memory device is implemented by a nonvolatile solid-state memory technology characterized by a first access speed. It is acknowledged that the write data has been successfully written to memory locations in the first memory device. The write data is written to a second memory device in response to receiving the low latency store command. The second memory device is implemented by a volatile memory technology. At least a portion of the data in the first memory device is written to a third memory device when a predetermined amount of data has been accumulated in the first memory device. The third memory device is implemented by a nonvolatile solid-state memory technology characterized by a second access speed. The first access speed is faster than the second access speed.

Another embodiment is a system for storing data that includes a first memory device, a second memory device and a third memory device. The first memory device is implemented by a nonvolatile solid-state memory technology and is characterized by a first access speed. The second memory device is implemented by a volatile memory technology. The third memory device is implemented by a nonvolatile solid-state memory technology characterized by a second access speed. The first access speed is faster than the second access speed. The system is configured to perform a method that includes receiving a low latency store command that includes write data. The write data is written to the first memory device in response to receiving the low latency store command. It is acknowledged that the write data has been successfully written to memory locations in the first memory device. The write data is written to the second memory device in response to receiving the low latency store command. At least a portion of the data in the first memory device is written to the third memory device when a predetermined amount of data has been accumulated in the first memory device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention provide nonvolatile data storage that includes an integrated solution that uses a flash memory device and a low latency nonvolatile memory device, such as magnetoresistive random access memory (MRAM). In an embodiment, the flash memory is "not-and" (NAND) flash memory combined with MRAM and static random access memory (SRAM) to provide low latency storage of data in a persistent manner. The MRAM buffers writes of data of a sequential nature which require low latency, where "sequential nature" implies that a write needs to be completed before the next memory operation can be undertaken. Embodiments allow the system to commit a subsequent write command after the data is quickly written to MRAM as compared to relatively high latency writes to flash memory, thus resulting in substantially reduced latency for a persistent write or store command. Persistent storage of data occurs when the data is written to the MRAM because MRAM is non-volatile and, hence, when the system loses power the data written to the MRAM is recoverable.

Thus, embodiments are directed to a hybrid non-volatile NAND flash based storage device which provides low latency persistent writes for specific data classes such as storage system metadata. In a typical storage system, there are certain classes of critical data which require persistent writes. One example is file system metadata, because if file system metadata is lost, the file system might get corrupted. It is especially crucial in large scale systems with lots of storage devices not to corrupt the file system. Thus, embodiments are required to ensure that the loss of a storage device does not corrupt the entire file-system. Embodiments described herein provide reliable, consistent, low latency, persistent writes for critical data without incurring the disadvantages of batteries and super capacitors (e.g., maintenance, form factor, complexity disadvantages).

Embodiments include a new write command, referred to herein as a "low latency store command" that writes data quickly to a fast access persistent data storage device (e.g., having a relatively fast access time) and returns a write acknowledgement quickly so that a next memory command can be serviced as quickly as possible. Out of the critical path of data accesses, the memory controller determines when to copy data from the fast access persistent data storage device into a more permanent persistent storage device (e.g., when a programmable and predetermined amount of data has been written to the fast access persistent storage device). The fast access persistent storage device is characterized by an access speed for stores/writes that is higher than the access speed for the more permanent persistent storage device. In an embodiment, the fast access persistent storage device holds only a relatively small amount of data and the fast access persistent storage device is overwritten by new data once the data has been spilled to a more permanent location (e.g., to the more permanent persistent storage device).

Figure 1:
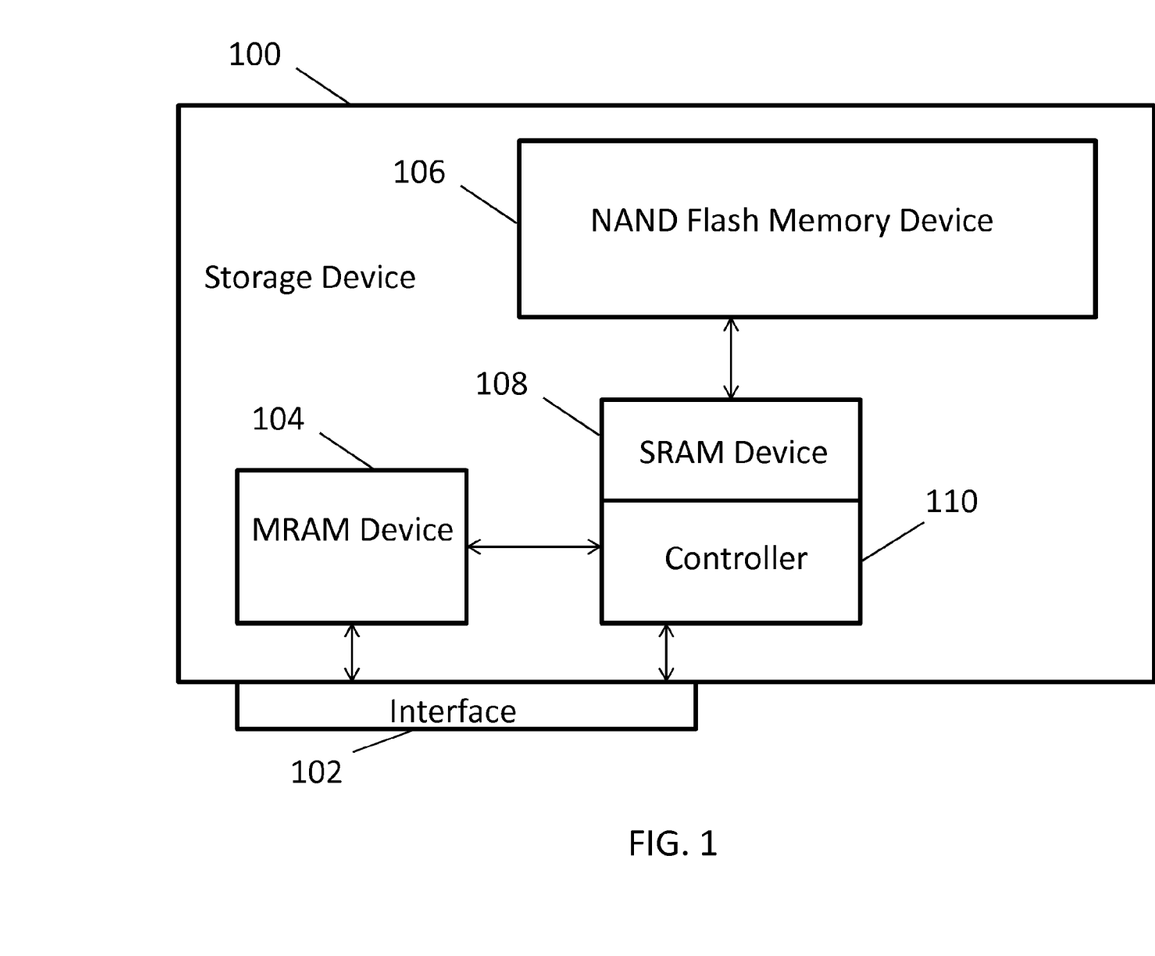
FIG. 1 illustrates a block diagram of a storage device according to an embodiment of the present invention.

Turning now to FIG. 1, a block diagram of an exemplary storage device 100 is generally shown. The storage device 100 includes an interface 102 to provide communication with a computer system. The storage device 100 may be referred to as a hybrid MRAM-flash storage device. In an embodiment, the storage device 100 is a card or board in communication with the computer system via a bus that serves as the interface 102. The exemplary storage device 100 includes a MRAM device 104 (i.e., a fast access persistent storage device), a NAND flash memory device 106 (i.e., more permanent persistent storage device), a SRAM device 108 and a controller 110. As known in the art, both the MRAM device 104 and the NAND flash memory device 106 are examples of nonvolatile solid-state device memory technologies, and the SRAM device 108 is an example of a volatile memory technology. Upon receiving a low-latency store or write command, the controller 110 directs the associated write data to the MRAM device 104 and SRAM device 108 to be written with low latency (equivalently, fast write access speed). By quickly writing the data to the MRAM device 104 and SRAM device 108, the system and storage device 100 are freed to perform another command more quickly, such as a subsequent write command.

In an embodiment, metadata identifying the write data is also written to the MRAM device 104. The metadata may include data such as, but not limited to: address, size and commitment status. Note that this metadata is different from the file system metadata mentioned earlier; the file system metadata would, in fact, correspond to the write data to be written with low latency. Commitment status indicates, whether the data has been written to the flash memory device 106. The commitment status is used during failure recovery to determine whether to read the data from the flash memory device 106 or from the MRAM device 104. After the data has been written to the MRAM device 104 an acknowledgement is sent indicating that the data has safely been stored. In an embodiment, the controller 110 is implemented using one or more field programmable gate arrays (FPGAs). In another embodiment the controller is implemented using an application-specific integrated circuit (ASIC).

Figure 2:
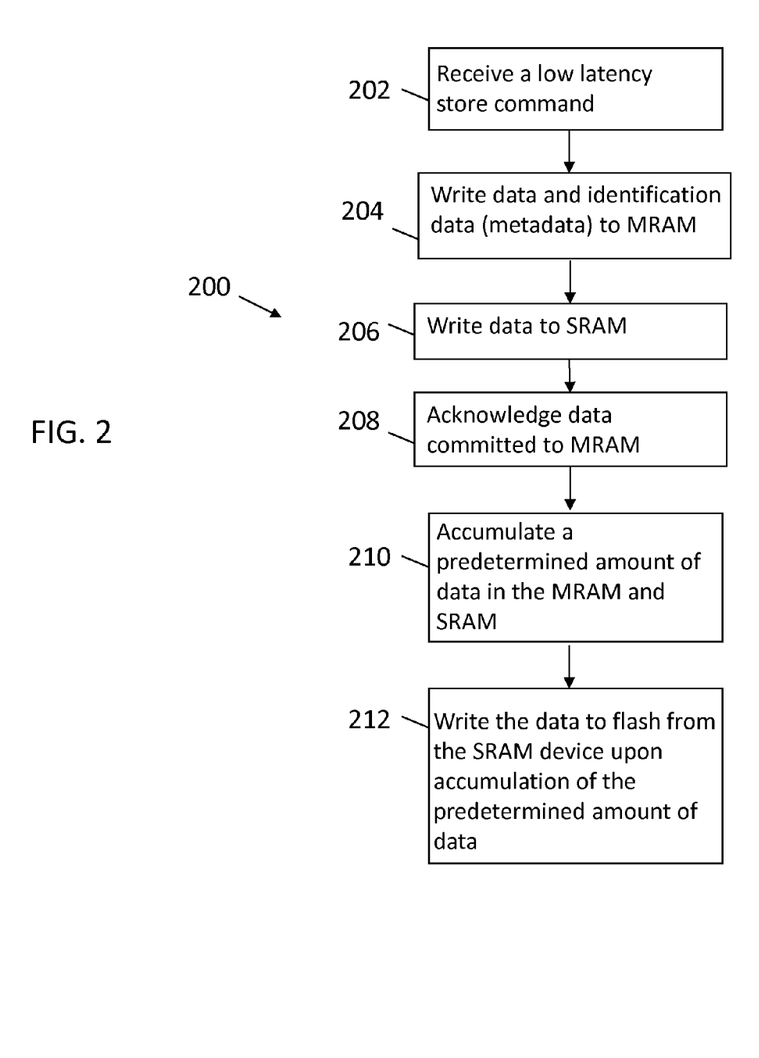
FIG. 2 illustrates a block diagram of a process for performing a storage operation that provides low latency and persistent storage of data in accordance with an embodiment of the present invention.

FIG. 2 is a block diagram of a storage operation 200 that provides low latency and persistent data storage according to an embodiment. In an embodiment the processing shown in FIG. 2 is performed by the controller 110. At block 202, a low latency data store command is received by a storage device, such as storage device 100. 18. In an embodiment, the receiving at block 202 is via an interface that includes a computer system call and/or an event generated by a remote computer system. At block 204, write data and identification data, describing the data, are both written to the MRAM device 104. In block 208, the data is written to the SRAM device 108. In block 208, an acknowledgement of successful commitment or storage of the data to the MRAM device 104 (also referred to herein as being successfully written) is communicated to the computer system. In embodiments, the controller 110 communicates the acknowledgement to a main board or processor of a computer system, where the acknowledgement signals that another command may be executed on the storage device 100. In block 210, a predetermined amount of data is accumulated in the MRAM device 104 and SRAM device 108. In an embodiment, the predetermined amount of data is accumulated via multiple storage or write command operations (e.g., multiple iterations of blocks 202, 204, 206 and 208). After the predetermined amount of data is accumulated, the predetermined amount of data is written from the SRAM device 108 to the flash memory device 106, thus producing a buffering effect for the data transfer. In an embodiment, the predetermined amount of data is a page of flash memory, where a flash page of data is accumulated and is then written to flash memory. After the data is written to the flash memory device 106, the portion of the SRAM device 108 and MRAM device 104 containing the previously written data may be overwritten by future storage operations.

The data contained in the MRAM device 104 is also contained in the SRAM device 108. Read operations on this data, either while copying the data to the flash memory or in case a read operation is required on this data, are performed from the SRAM device. The SRAM device, typically, may have significantly higher bandwidth than the MRAM device, so this mode of operation facilitates higher performance.

The operation 200 shown in FIG. 2 provides low latency storage of important data without a backup or redundant energy supply, thus simplifying the design of storage hardware and reducing costs. In an example, if data is written to the MRAM device 104 and system power is lost, the MRAM device 104 retains the information without a redundant energy supply. After power is regained, the system can communicate the data stored on the MRAM device 104 to the SRAM device 108 and flash memory device 106, when appropriate. The arrangement also provides low latency storage, because writes to the MRAM device 104 may be significantly faster than writes to the flash memory device 106. In embodiments, the MRAM device 104 and SRAM device 108 are each divided into portions, where the portions are the size of the predetermined amount of data to be written to the flash memory device 106. Thus, when the predetermined amount of data has been accumulated (e.g., at block 210), the portion is written to the flash memory device 106 (at block 212) while other portions of the MRAM device 104 and SRAM device 108 are free to perform store commands simultaneously (e.g., other MRAM and SRAM low latency stores). Thus, the portions of the MRAM device 104 and SRAM device 108 allow operations to continue as the slower operation of writing to the flash memory device 106 is executed.

Figure 3:
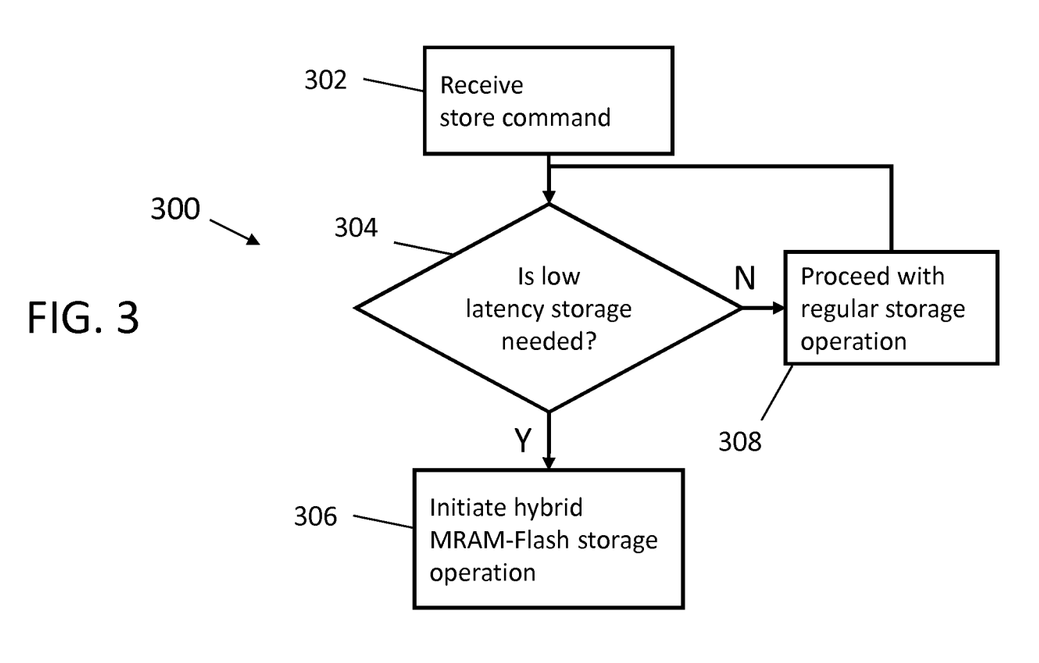
FIG. 3 illustrates a block diagram of a process for monitoring storage processes and determining when to perform a persistent storage process in accordance with an embodiment of the present invention.

FIG. 3 is a block diagram of an operation 300 to monitor storage processes and determine when to perform the low latency storage process described above. In an embodiment the processing shown in FIG. 3 is performed by the controller 110. At block 302, a store or write command is received by the system. At block 304, a monitoring module determines if a low latency storage operation is needed. In an embodiment, transparent operation is provided by a monitoring module that is located on the controller 110. The monitoring module is configured to determine if the low latency operation is needed based on monitored workload characteristics of the memory device and computer system. In an exemplary embodiment, pre-determined critical types of data, such as file system metadata, are written using low-latency operations. Thus, the monitoring module identifies if critical data is being written, and determines the need for low-latency operations on this basis. In embodiments, the controller 110 monitors traffic in the storage device 100 or other processing activities to determine if the storage operation requires low latency. In an embodiment, the monitoring module determines if the data stream being written persistently, is sequential in nature (i.e. that there is a temporal dependence wherein the arrival of the next system request is temporally dependent upon the completion of the current request). In such a case, the monitoring module determines that a low-latency write operation should be used. At block 306, the hybrid storage operation using MRAM and flash devices, as described above, is initiated based on the determination of a need for low latency. At block 308, the process proceeds with a regular storage operation if it is determined that low latency is not needed. In an embodiment, the regular or normal storage operation may include executing a write command directly to the flash memory device 106.

In an embodiment, multiple areas are allotted in the MRAM in order to provide continuous operation. When multiple areas are allotted, once one area is full another area is written to while the spill operation to the flash memory is occurring. Another option is for different applications to write to different areas in the MRAM. In another embodiment, multiple MRAMs are utilized. When multiple MRAMs are utilized, different applications may write to different MRAMs based on, for example, performance requirements or workload characteristics.

Figure 4:
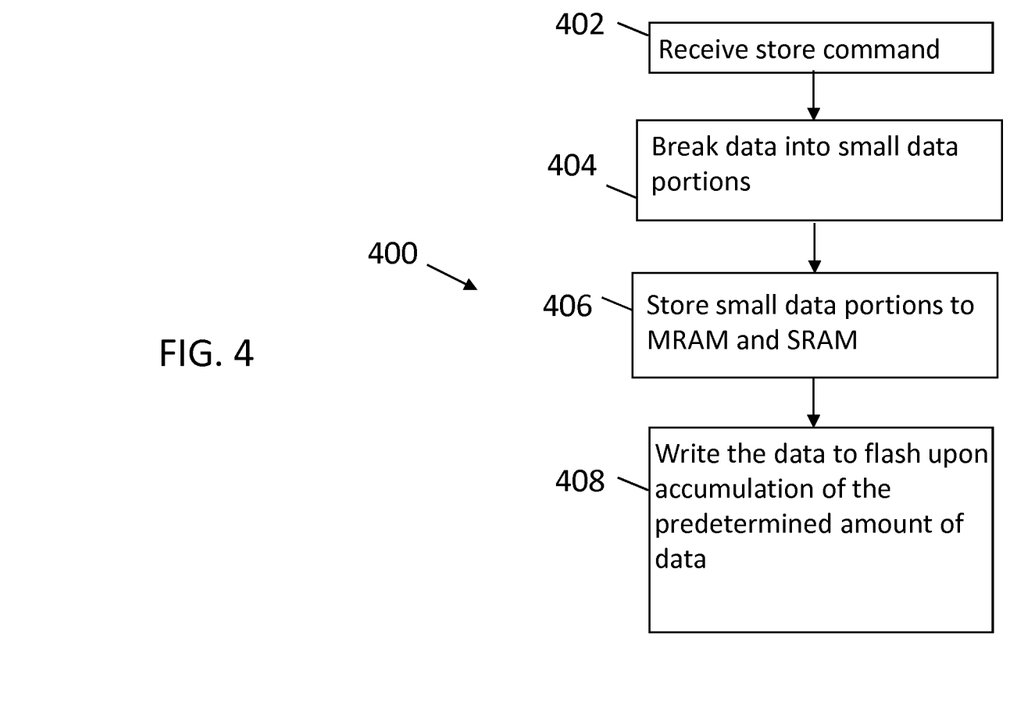
FIG. 4 illustrates a block diagram of a process for performing a persistent and low latency data storage operation in accordance with an embodiment of the present invention.

FIG. 4 is a block diagram of an embodiment of an operation 300 for performing persistent and low latency data storage operations for a data log. In an embodiment the processing shown in FIG. 4 is performed by the controller 110. In the embodiment shown in FIG. 4, a logging device is provided that allows for small stores with low latency, with all of the stores being backed by MRAM. At block 402, data store commands are received. At block 404, the data is broken up into small portions. Breaking the data up into small portions allows simultaneously writing a portion of data to the flash device, while other portions of the MRAM device 104 and SRAM device 108 are free to perform store commands simultaneously (e.g., other MRAM and SRAM low latency stores). At block 406, each of the small data portions are stored to MRAM and SRAM, as described above in FIG. 2. At block 408 (also described above), after a predetermined amount of data is accumulated in the MRAM device 104 and the SRAM device 108, the data it is then written to the flash memory device 106. As depicted, all storage commands are processed as described above in FIG. 2, thus providing low latency and persistence for each storage operation.

Embodiments provide for a low latency nonvolatile data storage that includes an integrated flash memory device, SRAM device and MRAM device. In an embodiment, the arrangement provides low latency storage of important data in a persistent manner by buffering data storage to MRAM and SRAM and subsequently transferring a predetermined amount of the data to the flash device.

In exemplary embodiments, the software interface for accessing the low latency store is a standard block device driver interface. In this case, the device driver can ensure that whenever the full extent of a flash page has been stored into MRAM the contents are stored to flash and whenever a new write arrives that should be stored on a flash page different from the one being written, the remaining contents of the flash page being written are retrieved, the portion of page in SRAM that has not been written is backfilled with the contents of the page being modified, and the completed page is written to flash. In additional embodiments, several streams are contemplated in MRAM, intending that several pages are being progressively filled, thus allowing for more flexibility in the sequence of addresses into which the portions of the contents are written through low latency stores. In additional exemplary embodiments the interface is a standard block device interface, and a monitor, implemented either in hardware or in software, monitors the characteristics of the write workload (the workload characteristics), using techniques known in the art, looking for sequentiality in the write address pattern and inferring the potential sequentiality and causality of the code generating the writes to the device. If the monitor estimates that a performance benefit would be gained by applying low latency stores, then the block device driver substitutes standard stores (i.e., stores going directly to flash memory) with low latency stores. In exemplary embodiments, the interface for accessing the low latency stores is a dedicated device interface, for example implemented via a system call (syscall). In exemplary embodiments, the low latency store operation can be triggered by a remote computer system connected by means of computer network equipment to the local computer hosting the storage device implementing the low latency store method and system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for storing data, the method comprising:
receiving a low latency store command, the low latency store command including write data;
writing the write data to a first memory device in response to receiving the low latency store command, the first memory device implemented by a nonvolatile solid-state memory technology characterized by a first access speed;
acknowledging that the write data has been successfully written to memory locations in the first memory device;
writing the write data to a second memory device in response to receiving the low latency store command, the second memory device implemented by a volatile memory technology; and
writing at least a portion of the write data in the first memory device to a third memory device, responsive to accumulating a predetermined amount of data in the first memory device, the third memory device implemented by a nonvolatile solid-state memory technology characterized by a second access speed, and the first access speed faster than the second access speed.

2. The method of claim 1, wherein writing at least a portion of the write data in the first memory device to the third memory device comprises copying the write data from the second memory device to the third memory device.

3. The method of claim 1, wherein the first memory device is a magnetoresistive random access memory (MRAM) and the second memory device is a static random access memory (SRAM).

4. The method of claim 1, wherein the third memory device is a flash memory.

5. The method of claim 4, wherein the predetermined amount of data comprises a flash page.

6. The method of claim 1, wherein the writing the write data to the first memory device is further in response to workload characteristics.

7. The method of claim 6, further comprising monitoring a workload to determine the workload characteristics, the workload characteristics including at least one of data types, processing activity types, and data stream characteristics.

8. The method of claim 1, wherein the writing the write data to the first memory device comprises writing the write data and identification data to the first memory device.

9. The method of claim 1, wherein the receiving the low latency store command is via an interface that includes at least one of a computer system call and an event generated by a remote computer system.

10. A system for storing data, the system comprising:
a first memory device implemented by a nonvolatile solid-state memory technology and characterized by a first access speed;
a second memory device implemented by a volatile memory technology; and
a third memory device implemented by a nonvolatile solid-state memory technology characterized by a second access speed, and the first access speed faster than the second access speed, the system configured to perform a method comprising:
receiving a low latency store command, the low latency store command including write data;
writing the write data to the first memory device in response to receiving the low latency store command;
acknowledging that the write data has been successfully written to memory locations in the first memory device;
writing the write data to the second memory device in response to receiving the low latency store command; and
writing at least a portion of the write data in the first memory device to the third memory device, responsive to accumulating a predetermined amount of data in the first memory device.

11. The system of claim 10, wherein the writing at least a portion of the write data in the first memory device to the third memory device comprises copying the write data from the second memory device to the third memory device.

12. The system of claim 10, wherein the first memory device is a magnetoresistive random access memory (MRAM) and the second memory device is a static random access memory (SRAM).

13. The system of claim 10, wherein the third memory device is a flash memory.

14. The system of claim 13, wherein the predetermined amount of data comprises a flash page.

15. The system of claim 10, wherein the writing the write data to the first memory device is further in response to workload characteristics.

16. The system of claim 15, wherein the method further comprises monitoring a workload to determine the workload characteristics, the workload characteristics including at least one of data types, processing activity types, and data stream characteristics.

17. The system of claim 10, wherein the writing the write data to the first memory device comprises writing the write data and identification data to the first memory device.

18. The system of claim 10, wherein the receiving the low latency store command is via an interface that includes at least one of a computer system call and an event generated by a remote computer system.

19. A computer program product for storing data, the computer program product comprising:
a non-transitory computer readable storage medium having computer readable program code embodied therewith, the computer readable program code comprising:
computer readable program code configured for:
receiving a low latency store command, the low latency store command including write data;
writing the write data to a first memory device in response to receiving the low latency store command, the first memory device implemented by a nonvolatile solid-state memory technology characterized by a first access speed;
acknowledging that the write data has been successfully written to memory locations in the first memory device;
writing the write data to a second memory device in response to receiving the low latency store command, the second memory device implemented by a volatile memory technology; and
writing at least a portion of the write data in the first memory device to a third memory device, responsive to accumulating a predetermined amount of data in the first memory device, the third memory device implemented by a nonvolatile solid-state memory technology characterized by a second access speed, and the first access speed faster than the second access speed.

20. The computer program product of claim 19, wherein writing at least a portion of the write data in the first memory device to the third memory device comprises copying the write data from the second memory device to the third memory device.

* * * * *